Nov. 12, 1929.　　　J. W. MOTHERWELL　　　1,734,977
PRESSURE GAUGE
Filed May 23, 1924　　　2 Sheets-Sheet 1

Inventor:
Joseph W. Motherwell
by George A. Rockwell,
atty.

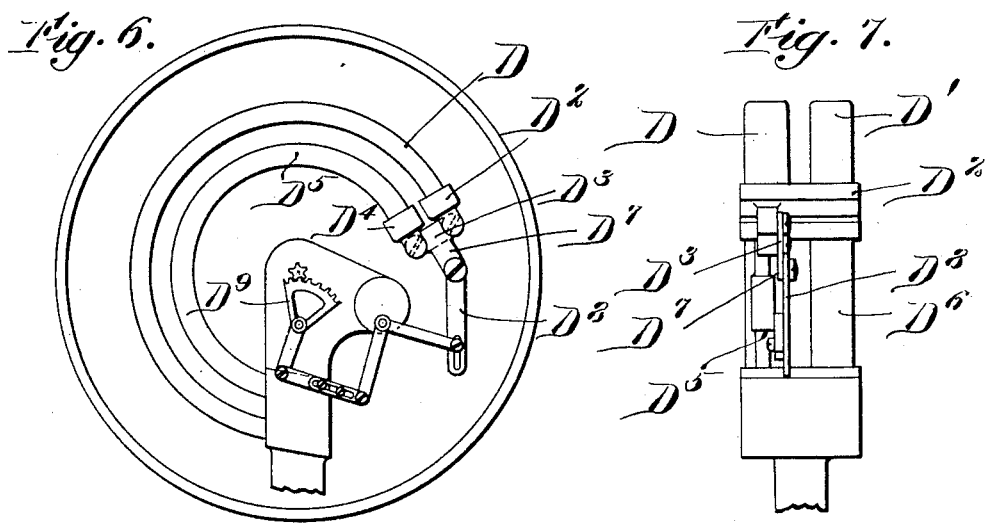

Patented Nov. 12, 1929

1,734,977

UNITED STATES PATENT OFFICE

JOSEPH W. MOTHERWELL, OF MELROSE, MASSACHUSETTS, ASSIGNOR TO THE ASHTON VALVE COMPANY, OF CAMBRIDGE, MASSACHUSETTS, A CORPORATION OF MASSACHUSETTS

PRESSURE GAUGE

Application filed May 23, 1924. Serial No. 715,399.

The principal object of my invention is to provide a pressure gauge having great accuracy particularly in cases where considerable strength and considerable flexibility are desirable, especially for large gauges and where wide ranges between increments of pressure are to be indicated, or in other words where large arcs for small ranges of pressure are to be indicated.

A feature of my invention consists in providing a plurality of Bourdon tube springs connected so as to permit their cooperation while permitting relative movement of them, the object in using a plurality of such tubes being to provide more sensitiveness and flexibility together with increase of strength than is possible with one tube and the advantage is that, although the strength is increased, accuracy and efficiency are maintained.

Other features will be pointed out below.

In the drawings

Figure 6 is a front elevation of another form; and

Figure 7 is a side elevation of the form of Fig. 6 but without some of the parts.

Figure 1:
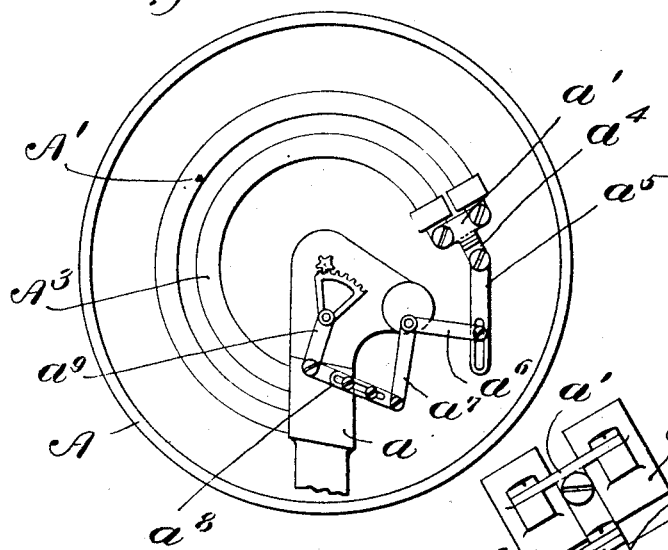
Figure 1 is a front elevation of a gauge embodying my invention, the dial and other outer parts being omitted.
Figure 2:
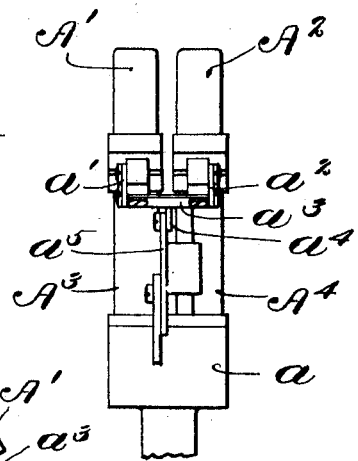
Figure 2 is a side elevation thereof but without some of the parts.
Figure 3:
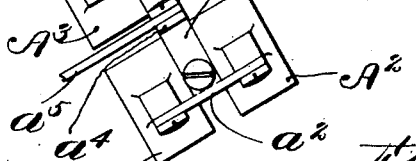
Figure 3 is an enlarged bottom plan detail of a portion of the device of Fig. 1.

In Figs. 1 to 3 I show a gauge casing A within which is the socket $a$ leading to the four Bourdon tubes $A'$ $A^2$ $A^3$ and $A^4$, tubes $A'$ and $A^2$ being of substantially equal radius and being outside of, and concentric with, the tubes $A^3$ and $A^4$, which are of substantially equal radius. The movable ends of tubes $A'$ and $A^3$ are pivotally connected to each other by link $a'$ and the movable ends of tubes $A^2$ and $A^4$ are pivotally connected to each other by link $a^2$. Links $a'$ and $a^2$ are connected by link $a^3$ which has a depending lug $a^4$ pivotally connected to link $a^5$ which has slotted connection with arm $a^6$ of a bell crank lever which is pivoted to an extension of socket $a$, the other arm $a^7$ of the bell crank being pivotally connected to link $a^8$, which may be adjustable if desired, link $a^8$ being pivotally connected to the rocking segment $a^9$ which, as is well known in the art, operates the indicating pointer. In this form the movable end of each tube may move independently of the movable ends of the three other tubes but still each of said ends has indirect pivotal connection with the segment without acting merely through any other movable end. An important advantage of this form is that it completely avoids any unequal strain that might be caused by unequal deflection if the movable ends of members $A'$ and $A^3$, for example, were rigidly connected and also avoids any unequal strains due to manufacturing imperfections such as variations in temper or in tube manufacturing, the latter strains being likely if the movable ends of members $A'$ and $A^2$ were rigidly connected and such manufacturing imperfections were existent.

Figure 4:
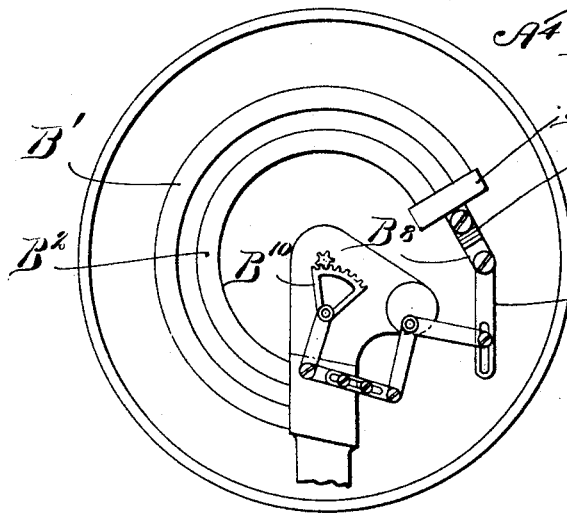
Figure 4 is a front elevation of a modification.
Figure 5:
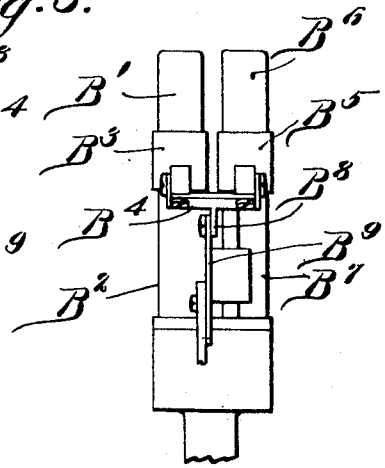
Figure 5 is a side elevation of the form of Fig. 4 but without some of the parts.

In the form of Figs. 4 and 5 tubes $B'$ and $B^2$ have their movable ends rigidly connected by head $B^3$ having pivotal connection with bracket $B^4$, the latter having also pivotal connection with head $B^5$ which rigidly connects together the movable ends of tubes $B^6$ and $B^7$. From bracket $B^4$ depends lug $B^8$ pivotally connected to link $B^9$ which is operatively connected to segment $B^{10}$ as in the form of Fig. 1. In this form of Figures 4 and 5 the tubes $B'$ and $B^2$ may move as a unit separate from the tubes $B^6$ and $B^7$.

In the form of Figs. 6 and 7 tubes D and $D'$ are side by side and their movable ends are rigidly connected by head $D^2$ pivotally connected to bracket $D^3$, the latter being also pivotally connected to head $D^4$ which rigidly connects the movable ends of tubes $D^5$ and $D^6$. In this form the bracket $D^3$ has a depending lug $D^7$ operatively connected by link $D^8$ to segment $D^9$, as in the form of Fig. 1. In this form any strains due to unequal deflection are minimized.

It will be noted that I have provided a plurality of tubes each of which is free to move under pressure throughout its normal travel without retardation or other interference from any other tube and so connected as to contribute their joint movement to the movement of the sector.

It will be observed that the center line of the links such as $a^5$, $B^9$ and $D^8$ are parallel to the tangent to the locus of the movable end deflection at a point midway between the points of no load and maximum load.

The reason for this is that the movable ends of the tubes all occupy normally substantially the same position radially of the gauge and are actuated by the same pressure with the consequence that the movable ends will tend to move outwardly in such manner that the center line of the link connection will be parallel to the tangent above referred to whereas if the tubes are of substantially different arcuate length their movable ends will tend to move outwardly in varying directions and each movable end will consequently tend to hinder or impede the independent action of the other movable ends.

What I claim is:

1. A device of the character described comprising a sector; a plurality of spring tubes arranged side by side axially of the device and all connected with the same source of pressure and each having a fixed end and a movable end, the movable ends being movable with relation to each other; and a link pivotally and directly connected with each of said movable ends, said tubes having their dimentional characteristics relatively so proportioned that the points of connection of the link with said movable ends remain substantially in line radially with relation to the centre of the device throughout the movement of the tubes and said dimensional characteristics being relatively so proportioned that said link extends substantially radially with relation to the centre of the device throughout the movement of the tubes, the motion of the ends of the tubes being determined by the pressure within the tubes, the elastic constants of the tubes and the link; and means to operatively connect said link with said sector.

2. A device of the character described comprising a plurality of spring tubes arranged side by side axially of the device and all connected with the same source of pressure and each having a fixed and a movable end; and a link pivotally and directly connected with each of said movable ends, said tubes having their dimensional characteristics relatively so proportioned that the points of connection of the link with said movable ends remain substantially in line radially with relation to the centre of the device throughout the movement of the tubes and said dimensional characteristics being relatively so proportioned that said link extends normally substantially radially with relation to the centre of the device, each movable end being movable independently of the other movable ends.

3. A device of the character described comprising a plurality of spring tubes, arranged side by side axially of the device and all connected with the same source of pressure and each having a fixed end and a movable end; and a link pivotally connected with said movable ends, said tubes having their dimensional characteristics relatively so proportioned that the points of connection of the link with said movable ends remain substantially in line radially with relation to the centre of the device throughout the movement of the tubes and said dimensional characteristics being relatively so proportioned that said link extends normally substantially radially with relation to the centre of the device, each movable end being movable independently of the other movable ends; and another link having pivotal connection with said first-mentioned link, the centre line of said other link being substantially parallel to the tangent to the locus of the movable end deflection at a point midway between the points of no load and maximum load.

4. A device of the character described comprising a plurality of concentric spring tubes, all connected with the same source of pressure and each having a fixed end and a movable end; a link pivotally connected with said movable ends, the points of connection of the link with said movable ends being substantially in line radially of the device and said link extending normally substantially radially of the device; a second plurality of concentric spring tubes, all connected with the same source of pressure as the first plurality of tubes and each having a fixed end and a movable end; another link pivotally connected with the movable ends of the second plurality of tubes, the points of connection of said second link with the movable ends of said plurality of tubes being substantially in line radially of the device; and a third link pivotally connected with said two other links, each movable end being movable independently of the other movable ends.

5. A device of the character described comprising a plurality of concentric spring tubes, all connected with the same source of pressure and each having a fixed end and a movable end; a link pivotally connected with said movable ends, the points of connection of the link with said movable ends being substantially in line radially of the device and said link extending normally substantially radially of the device; a second plurality of concentric spring tubes, all connected with the same source of pressure as the first plurality of tubes and each having a fixed end and a movable end; another link pivotally connected with the movable ends of the second plurality of tubes, the points of connection of said second link with the movable ends of said second plurality of tubes being substantially in line radially of the device, and a third link pivotally connected with said two other links, each movable in being movable independently of the other movable ends, the inner spring of each plurality being of substantially the same diameter and having their axes substantially coincident.

6. A device of the character described comprising a plurality of concentric spring tubes, all connected with the same source of pressure and each having a fixed end and a movable end, a link pivotally connected with said movable ends, the points of connection of the link with said movable ends being substantially in line radially of the device and said link extending normally substantially radially of the device; a second plurality of concentric spring tubes, all connected with the same source of pressure as the first plurality of tubes and each having a fixed end and a movable end; another link pivotally connected with the movable ends of the second plurality of tubes, the points of connection of said second link with the movable ends of said second plurality of tubes being substantially in line radially of the device; and a third link pivotally connected with said two other links, each movable end being movable independently of the other movable ends, said third link having its center line substantially parallel to the tangent to the locus of the movable end deflection at a point midway between the points of no load and maximum load.

7. A device of the character described comprising a sector; a plurality of Bourdon tubes arranged side by side axially of the device and all connected with the same source of pressure and each having a fixed end and a movable end, each movable end being movable independently of the other movable end or ends, said tubes being of substantially the same length and having their other dimensional characteristics relatively so proportioned that their movable ends remain substantially in the same position radially with relation to the centre of the device throughout the movement of the tubes; a link having pivotal operative connection with said movable ends; and means to operatively connect said link with said sector.

8. A device of the character described comprising a sector; a plurality of Bourdon tubes arranged side by side axially of the device and all connected with the same source of pressure and all of substantially the same radius and each having a fixed end and a movable end, each movable end being movable independently of the other movable end or ends, said tubes being of substantially the same length and having their other dimensional characteristics relatively so proportioned that their movable ends remain substantially in the same position radially with relation to the centre of the device throughout the movement of the tubes; a link having pivotal operative connection with said movable ends, the motion of the ends of the tubes being determined by the pressure within the tubes, the elastic constants of the tubes and the link; and means to operatively connect said link with said sector.

9. A device of the character described comprising a plurality of spring tubes, all connected with the same source of pressure and each having a fixed end and a movable end; and a link pivotally and directly connected with each of said movable ends, the points of connection of the link with said movable ends being substantially in line radially of the device throughout the movement of the tubes and said link extending normally substantially radially of the device, each movable end being movable independently of the other movable end or ends, and another link pivotally connected with the first-mentioned link at a point between the points of connection of the first-mentioned link with said movable ends.

10. A device of the character described comprising a plurality of spring tubes, all connected with the same source of pressure and each having a fixed end and a movable end; and a link pivotally and directly connected with each of said movable ends, the points of connection of the link with said movable ends being substantially in line radially of the device throughout the movement of the tubes and said link extending normally substantially radially of the device, each movable end being movable independently of the other movable end or ends, and another link pivotally connected with the first-mentioned link at a point between the points of connection of the first-mentioned link with said movable ends, the center line of said other link being substantially parallel to the tangent to the locus of the movable end deflection at a point midway between the points of no load and maximum load.

11. A device of the character described comprising a sector; a plurality of Bourdon tubes arranged side by side axially of the device and all connected with the same source of pressure and each having a fixed end and a movable end, each movable end being movable independently of the other movable end or ends, said tubes being of substantially the same length and having their other dimensional characteristics relatively so proportioned that their movable ends remain substantially in the same relation to each other throughout the movement of the tubes; a link having pivotal operative connection with said movable ends; and means to operatively connect said link with said sector.

12. A device of the character described comprising a sector; a plurality of Bourdon tubes arranged side by side axially of the device and all connected with the same source of pressure and each having a fixed and a movable end, each movable end being movable independently of the other movable end or ends, said tubes being of substantially the same length and having their other dimensional characteristics relatively so proportioned that their movable ends remain substantially in the same relation to each other throughout the movement of the tubes; a link having pivotal operative connection with said movable ends; another link pivotally connected with the first-mentioned link at a point between the points of connection of the first-mentioned link with said movable ends; and means to operatively connect said other link with said sector.

JOSEPH. W. MOTHERWELL.